United States Patent [19]

Yamasaki et al.

[11] Patent Number: 5,035,802

[45] Date of Patent: Jul. 30, 1991

[54] MEMBRANE FILTER MATERIAL HAVING EXCELLENT ORGANIC SOLVENT RESISTANCE, METHOD FOR FORMATION OF MEMBRANE FILTER AND PROCESS FOR PREPARATION OF BISMALEIMIDE POLYMER TO BE USED FOR MEMBRANE FILTER

[75] Inventors: Kazuyuki Yamasaki, Chiba; Kimio Yamamoto, Ichihara; Masanobu Watanabe, Ichihara; Kojiro Kan, Ichihara; Yoshio Nakayama, Ichihara, all of Japan

[73] Assignee: Mitsui Petrochemical Industries, Ltd., Tokyo, Japan

[21] Appl. No.: 607,283

[22] Filed: Oct. 31, 1990

Related U.S. Application Data

[62] Division of Ser. No. 396,976, Aug. 22, 1989, Pat. No. 4,983,717.

[30] Foreign Application Priority Data

Aug. 23, 1988 [JP] Japan .................. 63-207243
Aug. 23, 1988 [JP] Japan .................. 63-207244
Sep. 22, 1988 [JP] Japan .................. 63-238448

[51] Int. Cl.$^5$ .................................. B01D 29/00
[52] U.S. Cl. .................. 210/440; 210/500.23; 210/500.39
[58] Field of Search ............... 210/490, 500.23, 500.39

[56] References Cited

U.S. PATENT DOCUMENTS

| | | | |
|---|---|---|---|
| 4,921,931 | 5/1990 | Wang | 528/322 |
| 4,923,959 | 5/1990 | Kan et al. | 528/322 |
| 4,927,907 | 5/1990 | Corley | 528/322 |

*Primary Examiner*—Morton Foelak
*Attorney, Agent, or Firm*—Sherman and Shalloway

[57] ABSTRACT

A membrane filter material formed from a solvent resistant bimaleimide polymer which is formed by polymerizing a bismaleimide compound with a perhydrodiaza-type heterocyclic compound and has a main structural skeleton represented by the following formula:

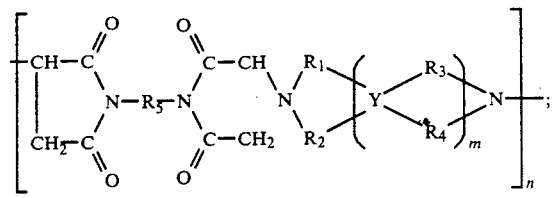

wherein $R_1$, $R_2$, $R_3$ and $R_4$ represents a lower carbon chain which is linear or contains a methyl group or ethyl group on the side chain, $R_5$ represents a divalent group containing an aromatic ring, Y is $>R<$ or $>N-R-N<$ in which R is a lower carbon chain, and m is 0 or 1.

This bismaleimide polymer can be a membrane filter material having an excellent organic solvent resistance. When this polymer is formed into a hollow fiber or plain film, a high separating and filtering capacity and an excellent organic resistance can be attained. A membrane filter material having an enhanced organic solvent resistance is provided by preparing the bismaleimide polymer by reacting the bismaleimide compound and perhydrodiaza-type heterocyclic compound in a halogen-containing organic solvent in the present of a small amount of a phenol.

12 Claims, No Drawings

MEMBRANE FILTER MATERIAL HAVING EXCELLENT ORGANIC SOLVENT RESISTANCE, METHOD FOR FORMATION OF MEMBRANE FILTER AND PROCESS FOR PREPARATION OF BISMALEIMIDE POLYMER TO BE USED FOR MEMBRANE FILTER

This is a division of Application Ser. No. 07/396,976, filed Aug. 22, 1989, now U.S. Pat. No. 4,983,717, issued Jan. 8, 1991.

BACKGROUND OF THE INVENTION (1) Field of the Invention

The present invention relates to a membrane filter of a bismaleimide polymer having an excellent organic solvent resistance and a method for the formation thereof. More particularly, the present invention relates to a material for a membrane filter used for separating floating dusts, colloids, proteins and the like by macrofiltration or ultrafiltration, a method for forming a hollow yarn and a plain film from this material, and a preferred process for the preparation of a bismaleimide resin used for this membrane filter material.

(2) Description of the Related Art

Ultrafiltration membranes and selective permeation membranes are frequently used at the present because they can separate colloids, proteins, microorganisms and the like from dispersion media at high efficiencies. Furthermore, these filtration membranes are utilized for the waste water treatment in plants, buildings and the like, and they are also used in the fields of the food industry, medical industry and agriculture. In general, the membrane filter is formed into a plain membrane or a hollow fiber. The hollow fiber is widely used as a dialysis module for separating colloids, proteins, microorganisms and the like from a dispersion medium at a high frequency in the medicinal field. An aqueous solution has heretofore been used as the dispersion medium (the solution used for the module or the like), but with recent diversification of the technique, organic solvents are used as the dispersion medium. Furthermore, organic solvents are often used for regeneration and washing of hollow yarns. Therefore, development of a membrane filter having an excellent organic solvent resistance is desired.

As the material constituting the membrane filter, there have been used various organic polymers such as a polysulfone (Japanese Examined Patent Publication No. 56-54164), a photo-crosslinked polymer (Japanese Unexamined Patent Publication No. 59-136107 and Japanese Unexamined Patent Publication No. 58-84006) and a fluorine polymer (Japanese Unexamined Patent Publication No. 59-166541). Furthermore, there are known membrane filters composed of cellulose acetate, polyacrylonitrile or a polyamide. Moreover, a hollow yarn composed of a polyether-sulfone is used for removing proteins and the like from a dispersion medium at a high efficiency. A membrane filter composed of cellulose acetate or a polyamide is defective in that the heat resistance is poor. A filter membrane composed of a polysulfone has a large permeation amount of water, a high resistance to an acid and an alkali and a good heat resistance, but the organic solvent resistance is poor. A photo-crosslinked polymer has an organic solvent resistance, but the permeation of water or the like is insufficient. A fluorine polymer has an organic solvent resistance, but this polymer is defective in that since there is no appropriate solubilizing agent to be used for formation of a film, it is difficult to prepare a plain membrane and it is impossible to reduce the pore size.

A conventional hollow fiber composed of a polyether-sulfone is defective in that when acetone or an aromatic solvent is used as the dispersion medium, such troubles as damage by dissolution or swelling are caused. A fluorine resin can be mentioned as a membrane material having an organic solvent resistance, but this resin is poor in the solubility and there is not a suitable spinning solvent, and therefore, it is difficult to prepare a hollow yarn.

Under this background, we made investigations and found that a specific bismaleimide resin is suitable as a material of a selective membrane filter. However, a product obtained according to the conventional process for the preparation of a polymer of a bismaleimide compound has a low molecular weight, and some polymers are soluble in cresol and dichloromethane. As another method for the preparation of a bismaleimide resin, there is known a process comprising reacting bismaleimide with piperazine in dichloromethane or N-methylpyrrolidone (see Japanese Unexamined Patent Publication No. 50-142700). However, in such a solvent, gelation is promptly advanced, and the formed bismaleimide resin is not suitably used as a membrane material.

SUMMARY OF THE INVENTION

It is a primary object of the present invention to provide a selective filter membrane material composed of a bismaleimide polymer having a good organic solvent resistance and a good heat resistance.

Another object of the present invention is to provide a membrane filter in the form of a plain film or hollow yarn having a good organic solvent resistance, and a method for forming this membrane filter.

Still another object of the present invention is to provide a process for preparing a bismaleimide resin having a good organic solvent resistance, which is suitably used as a membrane filter material.

In accordance with one fundamental aspect of the present invention, there is provided a membrane filter material having an excellent organic solvent resistance, which comprises or consists essentially of a bismaleimide polymer formed by reacting a bismaleimide compound with a perhydrodiaza-type heterocyclic compound.

According to one preferred embodiment of the present invention, there is provided a membrane filter material having an excellent organic solvent resistance, as set forth above, wherein in the bismaleimide polymer, the molar ratio of the bismaleimide units to the perhydrodiaza-type heterocyclic compound units is in the range of from 0.7 to 1.3, and the bismaleimide polymer has a main structural skeleton represented by the following formula:

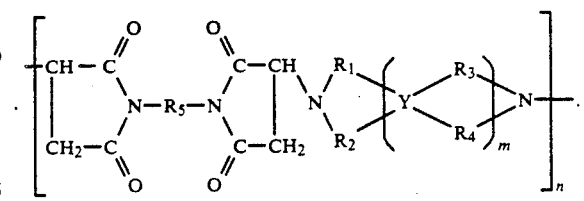

wherein $R_1$, $R_2$, $R_3$ and $R_4$ represent a lower carbon chain which is linear or contains a methyl group or ethyl on the side chain, $R_5$ represents a divalent group containing an aromatic ring, Y is >R< or >N—R—N< in which R represents a lower carbon chain, and m is 0 or 1.

Furthermore, a hollow fiber and a plain membrane, formed from the above-mentioned membrane filter material, are provided according to the present invention.

More specifically, in accordance with another aspect of the present invention, there is provided a method for forming a hollow yarn, which comprises dissolving in a solvent a bismaleimide polymer formed by reacting a bismaleimide compound with a perhydrodiaza-type heterocyclic compound and spinning the polymer solution as the spinning solution at a spinning speed of at least 2 m/min to form a hollow yarn-type membrane filter.

Furthermore, in accordance with still another aspect of the present invention, there is provided a method for preparing a plain membrane, which comprises dissolving in a solvent a bismaleimide polymer formed by reacting a bismaleimide compound with a perhydrodiaza-type heterocyclic compound to form a casting solution, casting or coating the casting solution on the surface of a film-forming supporting substrate and immersing the cast or coated solution together with the substrate into a coagulating liquid to form a plain film-type membrane filter.

In accordance with a further aspect of the present invention, there is provided a process for the preparation of a bismaleimide polymer having an excellent organic solvent resistance, which comprises reacting a bismaleimide compound with a perhydrodiaza-type heterocyclic compound in a halogen-containing organic solvent in the co-presence of a small amount of a phenol.

The membrane filter of the present invention is composed of a bismaleimide copolymer. In general, the bismaleimide polymer has a heat resistance. The bismaleimide compound used for the production of the polymer of the present invention has the following structural formula:

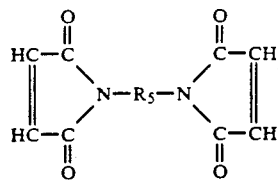

wherein $R_5$ represents a divalent group containing an aromatic group,
and has an aromatic ring in the molecule, and this bismaleimide is polymerized with the perhydrodiaza-type heterocyclic compound. The polymer having the above-mentioned structure is soluble in specific solvents, especially solvents having a strong polarity, and therefore, a casting solution or spinning solution of this polymer can easily be formed. In contrast, the polymer is insoluble in alcohols such as methanol (MeOH) and isopropanol (IPA), ketones such as acetone and methylethylketone (MEK), and aromatic solvents such as xylene and benzene. In the polymer, stretching is not caused by these organic solvents, and the polymer shows an excellent organic solvent resistance. Especially, a bismaleimide polymer of the present invention having a high molecular weight, for example, a number average molecular weight of at least 7000, is insoluble even in cresol and dichloromethane, and the organic solvent resistance is further improved.

As the polar solvent for forming a casting solution or spinning solution of the bismaleimide polymer of the present invention, there are present n-methylpyrrolidone, dimethylformamide and dimethylacetamide. Therefore, although the membrane filter material of the present invention has a high organic solvent resistance, it can easily be formed into a plain film or a hollow fiber.

Furthermore, a novel process for increasing the molecular weight of the bismaleimide polymer is provided according to the present invention.

In this preparation process, a halogen-containing organic solvent is used for the polymerization reaction, and a small amount of a phenol is made present in this solvent. Abrupt gelation of the polymer formed by the reaction is prevented by the presence of a small amount of the phenol, and therefore, a polyamino-bismaleimide polymer that can be valuably used as a membrane material, a filler and the like is formed.

The bismaleimide resin obtained as the polymerization reaction product has a high molecular weight and is excellent in the organic solvent resistance. Namely, the bismaleimide resin has a resistance to organic solvents, for example, alcohols such as methanol (MeOH), ethanol (EtOH) and isopropanol (IPA), ketones such as acetone and methylethylketone, halogen-containing solvents such as Flon gas, Freon 113 and trichlene, and aromatic solvents such as xylene and benzene.

The bismaleimide resin having an excellent organic solvent resistance according to the present invention is distinguishable over fluorine polymers in that there are present solvents in which the bismaleimide resin is soluble, and a membrane material such as a hollow fiber can easily be prepared from the bismaleimide resin.

DETAILED DESCRIPTION OF THE PREFERRED EMBODIMENTS

The bismaleimide polymer to be used for the membrane fiber of the present invention will first be described in detail.

The bismaleimide resin having an excellent organic solvent resistance is prepared by polymerizing a bismaleimide compound with a perhydrodiaza-type heterocyclic compound. This polymerization reaction is carried out in a halogen-containing organic solvent such as an alkyl halide or an aryl halide, and preferably, a small amount of a phenol.

Bismaleimide Compound

In the present invention, a compound represented by the following formula:

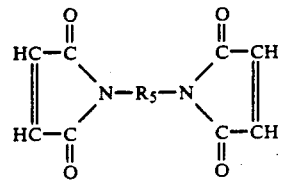

wherein $R_5$ represents a divalent group containing an aromatic ring,
is preferably used as the bismaleimide compound. As examples, there can be mentioned N,N'-m-phenylene-bismaleimide, N,N'-p-phenylene-bismaleimide, N,N',4,4'-diphenylmethane-bismaleimide, N,N',4,4'-diphenylether-bismaleimide, N,N',3,4'-diphenylether-bismaleimide, N,N',4,4'-diphenylsulfone-bismaleimide, N,N'-m-xylene-bismaleimide, N,N',3,4'-diphenylsulfone-bismaleimide and N,N',4,4'-diphenylmethane-biscitraconimide. Of these compounds, N,N'-m-phenylene-bismaleimide and N,N',4,4'-diphenylmethane-bismaleimide are especially preferred.

Perhydrodiaza-Type Heterocyclic Compound

A heterocyclic compound represented by the following formula:

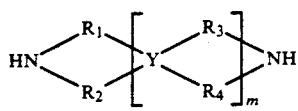

wherein $R_1$, $R_2$, $R_3$ and $R_4$ represent a lower carbon chain which is linear or contains a methyl group or ethyl group on the side chain, Y is $>R<$ or $>N-R-N<$ in which R is a lower carbon chain, and m is 0 or 1, is preferably used as the perhydrodiza-type heterocyclic compound to be reacted with the bismaleimide compound in the present invention, and this heterocyclic compound contains at least two nitrogen atoms in the molecule. It is preferred that $R_1$-$R_4$ and $R_5$ are lower carbon chains of $C_{1-10}$, especially $C_{2-10}$.

As the compound of the above formula in which m is 0, there can be mentioned piperazine, 2-methylpiperazine, 2,5-dimethylpiperazine and 1,4-perhydrodiazepine (homopiperidine), and as the compound of the above formula in which m is 1, there can be mentioned 1,3-di(N-piperazinyl) propane and 1,3-di(4-piperidinyl) propane. Ordinarily, perhydrodiaza-type heterocyclic compounds soluble in halogen-containing organic solvents are used.

Reaction Procedures

For the reaction, the bismaleimide compound is dissolved in a halogen-containing organic solvent, and the solution is stirred in a reaction vessel. A small amount of a phenol is added into the reaction vessel. The perhydrodiaza-type heterocyclic compound is dissolved in a halogen-containing organic solvent and the solution is dropped into the reaction vessel at room temperature over a period of a predetermined time.

It is preferred that the bismaleimide compound be dissolved in an amount of 5 to 17 g, especially 10 to 15 g, per 100 g of the halogen-containing organic solvent. At this concentration, the polymerization is advanced in a good state and a polymer having a preferable molecular weight is obtained.

In the present invention, dichloromethane, chloroform, tetrachloromethane, dichloroethane, trichloroethane, chlorobenzene and dichlorobenzene are preferably used as the halogen-containing organic solvent.

The perhydrodiaza-type heterocyclic compound used in the present invention is diluted with a halogen-containing organic solvent to form a solution to be added dropwise. The concentration is appropriately determined according to the dropping time and the stirring conditions in the reaction vessel. Halogen-containing organic solvents as exemplified above with respect to the bismaleimide compound are preferably used. However, the same solvent need not be used. The amount dropped of the perhydrodiaza-type heterocyclic compound (the charge ratio) is generally 0.76 to 1.43 moles per mole of the bismaleimide compound. If the amount of the perhydrodiaza-type heterocyclic compound is within the above-mentioned range, the obtained membrane is tough and is excellent in the permeation characteristics. In the present invention, it is preferred that the amount of the perhydrodiaza-type heterocyclic compound be 0.9 to 1.12 moles, especially 0.95 to 1.05 moles, per mole of the bismaleimide compound. The polymer formed from the maleimide compound and perhydrodiaza-type heterocyclic compound has an excellent organic solvent resistance and an excellent heat resistance.

In the process for the preparation of the bismaleimide resin of the present invention, in order to prevent gelation of the polymer and increase the molecular weight, a small amount of a phenol is added to the halogen-containing organic solvent.

The phenol type compound (referred to as "phenol" hereinafter) is added in a small amount. That is, the amount added of the phenol is 0.5 to 25 g, preferably 1 to 10 g, per 100 g of the bismaleimide compound. If the amount added of the phenol is within the above-mentioned range (0.5 to 25 g per 100 g of the bismaleimide compound), the molecular weight of the obtained bismaleimide resin is high, and an advantage is attained in that a bismaleimide resin having an excellent organic solvent resistance is obtained and no gel is formed in the reaction solvent.

As the phenol to be used in the present invention, there can be mentioned phenol, m-cresol, p-cresol, a mixture of m-cresol and p-cresol, m-isopropylphenol, p-isopropylphenol, hydroquinone, resorcinol, catechol and t-butylhydroquinone. Among them, phenol, m-cresol, p-cresol and a mixture of m-cresol and p-cresol are preferred.

Bismaleimide Polymer

The number average molecular weight of the bismaleimide polymer of the present invention is at least 7000, preferably at least 10000, for example, in the range of from 10000 to 25000. If the molecular weight is low, the bismaleimide polymer becomes soluble in cresol and dichloromethane, and therefore, the resistance to halogen-containing solvents and aromatic solvents is degraded. If the molecular weight is 7000 or higher, the bismaleimide polymer has an excellent resistance to alcohols such as methanol (MeOH), ethanol (EtOH) and isopropanol (IPA), ketones such as acetone and methylethyl-ketone (MEK), and aromatic solvents such as xylene and benzene.

It is construed that the organic solvent-resistant bismaleimide polymer obtained according to the above-mentioned preparation process has a structure represented by the following formula:

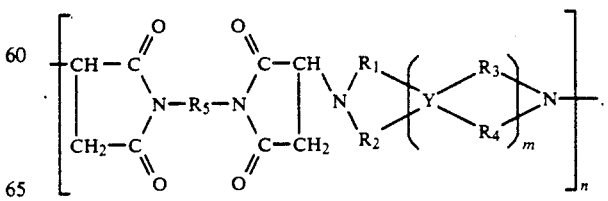

wherein $R_1$, $R_2$, $R_3$ and $R_4$ represent a lower carbon chain which is linear or contains a methyl group or ethyl group on the side chain, $R_5$ represents a divalent group containing an aromatic ring, Y is $>R<$ or $>N-R-N<$ in which R is a lower carbon chain, and m is 0 or 1, or this structure is partially branched. In the bismaleimide polymer, it is preferred that the molar ratio of the bismaleimide units to the perhydrodiazatype heterocyclic compound units be in the range of from 0.7 to 1.3, especially from 0.9 to 1.1. If the bismaleimide unit/perhydroaza-type heterocyclic compound unit molar ratio is within the above-mentioned range, the obtained membrane is tough and the bismaleimide polymer is excellent in permeation characteristics.

The bismaleimide polymer of the present invention is soluble in polar solvents such as n-methylpyrrolidone, dimethylformamide and dimethylacetamide.

Method for Forming Hollow Fiber of Organic Solvent-Resistant Polyamino-bismaleimide The bismaleimide polymer prepared according to the above-mentioned process is dissolved in a polar solvent to form a spinning solution. A syringe type spinning machine is used for spinning, and the spinning solution is spun into water by using water as the core liquid.

As the polar solvent, there can be used n-methylpyrrolidone, dimethylformamide, dimethylacetamide and HMPA (hexamethylphosphoric triamide). The concentration of the organic solvent-resistant polyamino-bismaleimide in the polar solvent is adjusted to 10 to 50%, preferably 15 to 30%. If the concentration is adjusted within this range, a hollow fiber can easily be formed by spinning, and good filtration characteristics can be given to the obtained hollow fiber.

An additive can be added to the spinning solution together with the bismaleimide polymer. A water-soluble polymer such as polyvinylpyrrolidone (PVP) can be used as the additive, and the concentration is adjusted to up to 50%, preferably up to 30%. PVP having an average molecular weight of about 300 to about 50000 is used. Spinning is carried out in water, and water acts as the coagulant for the spinning solution. Instead of water, an alcohol or a ketone can be used as the coagulant. As the core liquid, an alcohol or a ketone can be used instead of water.

The spinning speed is set at 2 to 70 m/min, preferably 4 to 50 m/min, most preferably 4 to 25 m/min. In the hollow yarn prepared under the above-mentioned conditions, it is preferred that the inner diameter be 0.2 to 4 mm, especially 0.4 to 3 mm, and that the outer diameter be 0.3 to 5 mm, especially 0.5 to 4 mm.

Method for Forming Plain Membrane of Bismaleimide Polymer

The plain membrane is prepared in the form of a single anisotropic plain membrane or a plain membrane lined with a backing. The single anisotropic plain membrane is prepared by dissolving the organic solvent-resistant polyamino-bismaleimide prepared according to the above-mentioned process in a casting liquid solvent which is a polar solvent as mentioned above, casting the solution on the surface of a plate substrate having a high flatness, immersing the plate substrate in a coagulating liquid to deposit a single anisotropic plain membrane, and washing the membrane overnight.

As the solvent for forming the casting solution of the bismaleimide polymer, there can be used n-methyl-pyrrolidone, dimethylformamide, dimethylacetamide and HMPA. The concentration of the bismaleimide polymer is adjusted to 10 to 35%, preferably 15 to 30%. At this concentration, the casting solution can easily be cast on the surface of the plate substrate and a preferred bismaleimide polymer membrane can be obtained.

An additive can be added to the casting liquid solvent together with the bismaleimide polymer. A water-soluble polymer such as polyvinylpyrrolidone (PVP) can be used as the additive. The concentration of the additive is adjusted to up to 50%, preferably up to 30%, and it is especially preferred that the additive be used at the same concentration as that of the bismaleimide polymer. PVP having a molecular weight of about 300 to about 50000 is used.

A glass plate or the like is used as the plate substrate, but the plate substrate is not limited to a glass plate or the like. Any of plate substrates can be used if it has a flat surface and is suitable for casting the solution of the bismaleimide polymer. An applicator or the like can be used for casting the solution of the bismaleimide polymer on the plate substrate, and the membrane-forming speed is 2 to 30 m/min, preferably 4 to 20 m/min.

The plain membrane lined with the backing is prepared by coating the above-mentioned bismaleimide polymer solution on a cloth of a nylon or polyester, instead of casting on the plate substrate, by means of an applicator, and immersing the coated cloth in a coagulating liquid to form the intended plain membrane lined with the backing.

As the coagulating liquid for the organic solvent-resistant polyamino-bismaleimide cast on the substrate, there can be used water, an alcohol and the like. By the coagulating liquid, the organic solvent-resistant polyamino-bismaleimide membrane is deposited and simultaneously, unnecessary substances are washed away.

The present invention will now be described in detail with reference to the following examples that by no means limit the scope of the invention.

The preparation of a bismaleimide polymer used for the production of a hollow fiber or plain membrane will now be described with reference to the following referential examples.

Referential Example 1

Preparation of Bismaleimide Polymer (PBM-1)

A separable flask having an inner volume of 1 liter was charged with 62.3 g of N,N',4,4'-diphenylmethane-bismaleimide (BM; purity=96%) and 5 g of a mixture of m-cresol and p-cresol as the phenol, and 445 g of dichloromethane was added and the mixture was stirred to form a homogeneous solution.

Separately, 14.5 g of piperazine (PZ) was dissolved in 200 g of dichloromethane. The solution was filled in a dropping funnel, and the piperazine solution was dropped into the above-mentioned BM solution over a period of about 1 hour and reaction was carried out at room temperature.

When about 30 minutes had passed from the point of completion of the dropwise addition, precipitation of a polymer began. Stirring was further conducted a whole day and night.

In order to remove the dichloromethane and cresol in the precipitated polymer, the precipitated polymer was washed in methanol (MeOH), and the methanol (MeOH) was removed under reduced pressure to obtain a bismaleimide polymer (PBM-1). When PBM-1 was analyzed by the gel permeation chromatography (GPC)

under conditions described below, it was found that MN was 15200 and MW was 64800, and the BM/PZ molar ratio was 1.0.

GPC Analysis Conditions

Columns: one column of Shodex AD-800P, two columns of Shodex AD-803/S (25 cm) and one column of Shodex AD-80M/S (25 cm)
Solvent: DMF (dimethylformamide)
Detector: UV (280 nm)
Apparatus: LC-5A supplied by Shimazu Seisakusho
Reference substance: polyethylene glycol

Referential Example 2

Preparation of Bismaleimide Polymer (PBM-2)

A separable flask (having an inner volume of 1 liter) was charged with 62.3 g of N,N',(4,4'-diphenylmethane)-bismaleimide (BW; purity=96.5%), and 450 g of dichloromethane and 5.0 g of mixture of m-cresol and p-cresol as the phenol were added and the mixture was stirred to form a homogeneous solution.

Separately, 16.7 g of 1,4-perhydrodiazepine (AZ) was dissolved in 200 g of dichloromethane and the solution was filled in a dropping funnel, and the 1,4-diazepine solution was dropped into the BM solution over a period of about 1 hour and reaction was carried out at room temperature. When about 30 minutes had passed from the point of termination of the dropwise addition, precipitation of a modified polymer began. Stirring was further conducted a whole day and night.

Then, dichloromethane was removed from the precipitated polymer under reduced pressure to obtain a bismaleimide polymer (PBM-2). When PBM-2 was analyzed in the same manner as described in Referential Example 1, it was found that MN was 13500 and MW was 31000, and the BM/AZ molar ratio was 1.0.

Referential Example 3

Preparation of Bismaleimide Polymer (PBM-3)

A separable flask having an inner volume of 1 liter was charged with 62.3 g of N,N'-(4,4'-diphenylmethane)-bismaleimide (BM; purity=96%), and 450 g of dichloromethane was added and the mixture was stirred to form a homogeneous solution.

Separately, 19.0 g of 2,5-dimethylpiperazine (MZ) was dissolved in 200 g of dichloromethane and the solution was filled in a dropping funnel. The 2,5-dimethylpiperazine solution was dropped into the BM solution over a period of about 1 hour and reaction was carried out at room temperature. After termination of the dropwise addition, stirring was further conducted over a whole day and night.

Then, the solution was dropped into a large quantity of methanol to precipitate a polymer. Methanol was removed from the precipitated polymer under reduced pressure to obtain a bismaleimide polymer (PBM-3). When PBM-3 was analyzed in the same manner as described in Referential Example 1, it was found that MN was 7300 and MW was 20500, and the BM/MZ molar ratio was 1.0.

The preparation and evaluation of organic solvent-resistant hollow yarns will now be described.

Evaluation Test of Organic Solvent-Resistant Hollow Films (1) Performance Test of Membrane Filter of Hollow Fiber The performance of a membrane filter composed of a hollow yarn is ordinary tested on a module fabricated by using the hollow fiber. Also in the present invention, a module was fabricated by using the organic solvent-resistant hollow fiber and the performance test was carried out by passing a test solution through the module.

(2) Organic Solvent Resistance Test of Organic Solvent-Resistant Hollow Fiber

At the organic solvent resistance test, the prepared hollow fiber was immersed in water for more than 1 day, and the length of the hollow fiber was measured. The measured length was designated as standard length a. Separately, the prepared hollow fiber was immersed in an objective organic solvent for the same time as the time of immersion in water, and the length b of the immersed hollow fiber was measured. The ratio of the length change of the hollow fiber by the organic solvent was expressed by $(b-a)/a \times 100$ (%). Thus, the stretching or shrinkage resistance to each organic solvent was calculated. As the test solvent, there were used alcohols such as methanol (MeOH) and isopropanol (IPA), ketones such as acetone and methylethylketone (MEK), and aromatic solvents such as xylene and benzene. It was found that the organic solvent-resistant hollow fibers obtained in the examples given hereinafter did not show stretching or contraction even by immersion in these organic solvents and they had an excellent organic solvent resistance.

Moreover, a module was fabricated by using the prepared organic solvent-resistant hollow fiber, and water, IPA and water were passed in this order through the module to examine the permeation quantity (l/m$^2$.hr) of each liquid. At this performance test, it was confirmed that the permeation quantity of water was not changed by the organic solvent, IPA.

Example 1

The piperazine type polyimide (PBM-1) prepared in Referential Example 1 was dissolved in dimethylformamide to form a spinning solution having a concentration of a syringe type spinning machine and water as the core liquid. The spinning speed was adjusted to 4 m/min. The inner diameter of the prepared hollow fiber was 0.8 mm and the outer diameter was 1.5 mm.

A module was fabricated by using the prepared hollow fiber, and when pure water was passed as the starting liquid through the module under application of a pressure of 1 kg/cm$^2$, it was found that the permeation quantity per m$^2$ for 1 hour was 200 l/m$^2$ hr. When a 0.05% aqueous solution of PEG having an average molecular weight of 50000 was passed as the starting liquid through the module under application of a pressure of 1 kg/cm$^2$, the water permeation quantity per m$^2$ for 1 hour was 90 l/m$^2$ hr and the blocking ratio of the solute, PEG, was 45%.

Evaluation of Organic Solvent Resistance of Hollow Fiber (1) Water, IPA and water were passed in this order as the starting liquid, and the permeation quantity (l/m$^2$ hr) of each liquid was determined. It was found that the formed hollow fiber was different from the conventional hollow fibers in that the permeation quantity of water was constant (200 l/m² hr) before and after the circulation of IPA. The permeation quantity of IPA was 70 l/m² hr.

(2) The prepared hollow fiber was immersed in water for more than 1 day, and the standard length a was measured. The hollow fiber was immersed in an organic solvent for the same time as the immersion time in water, and the changed length b was measured. The resistance of the hollow fiber to stretching or shrinkage by each organic solvent was evaluated based on the length change ration expressed by the formula of $(b-a)/a \times 100$ (%). Isopropanol (IPA), acetone, methanol (MeOH) and xylene were used as the test organic solvent. The results of the organic solvent resistance test of the hollow fiber of PBM-1 are shown in Table 1. From these results, it is seen that the hollow fiber was not influenced by any of the test organic solvents.

Example 2

A hollow fiber was prepared in the same manner as described in Example 1 except that n-methylpyrrolidone was used as the solvent of the spinning solution.

A module was fabricated by using the prepared hollow fiber. When pure water was passed as the starting liquid through the module under application of a pressure of 1 kg/cm², the permeation amount of pure water per m² for 1 hour was 100 l/m² hr. When a 0.05% aqueous solution of PEG having an average molecular weight of 50000 was passed as the starting liquid through the module under application of 1 kg/cm², the permeation quantity of water per m² for 1 hour was 40 l/m² hr, and the blocking ratio of the solute, PEG, was 71%.

The results obtained at the organic solvent resistance test were similar to those obtained in Example 1.

Example 3

PBM-2 obtained in Referential Example 2 was dissolved in dimethylformamide to form a spinning solution having a concentration of 15%. The spinning solution was spun in water by using a syringe type spinning machine and water as the core liquid. The spinning speed was set at 4 m/min. The inner diameter of the formed hollow fiber was 0.8 mm and the outer diameter was 1.5 mm.

A module was fabricated by using the hollow fiber, and pure water was passed as the starting liquid through the module under application of a pressure of 1 kg/cm². The permeation quantity of pure water per m² for 1 hour was 180 l/m².hr. When a 0.05% aqueous solution of PEG having an average molecular weight of 50000 was passed as the starting liquid through the module under application of 1 kg/cm², the permeation quantity of water per m² for 1 hour was 45 l/m².hr, and the blocking ratio of the solute, PEG, was 68%.

Example 4

PBM-3 obtained in Referential Example 3 was dissolved in dimethylformamide to form a spinning solution having a concentration of 15%. The spinning solution was spun into water by using a syringe type spinning machine and water as the core liquid. The spinning speed was set at 4 m/min. The inner diameter of the formed hollow fiber was 0.8 mm and the outer diameter was 1.5 mm.

A module was fabricated by using the formed hollow fiber, and pure water was passed as the starting liquid through the module under application of a pressure of 1 kg/cm². The permeation of pure water per m² for 1 hour was 190 l/m².hr. When a 0.05% aqueous solution of PEG having an average molecular weight of 50000 was passed as the starting liquid through the module under application of a pressure of 1 kg/cm², the permeation quantity of water per m² for 1 hour was 53 l/m².hr and the blocking ratio of the solute, PEG, was 60%.

TABLE 1

Results of Organic Solvent Resistance Test
[Performance Test (2) of Hollow Yarn of PBM-1]

| Organic Solvent | Change of Length water (a) | Change of Length Organic Solvent (b) | Change Ratio $[(b-a)/a \times 100]$ |
|---|---|---|---|
| IPA | 50 mm | 50 mm | 0% |
| acetone | 50 mm | 50 mm | 0% |
| MeOH | 48 mm | 48 mm | 0% |
| xylene | 51 mm | 51 mm | 0% |

Solvent immersion time ≧ 1 day

The preparation and evaluation of organic solvent-resistant plain membranes will now be described. The bismaleimide polymers PBM-1, PBM-2 and PBM-3 used for the production of the hollow fibers were similarly used for the production of the plain membranes.

Organic Solvent Resistance Test of Organic Solvent-Resistant Polyamino-bismaleimide Plain Membranes The formed plain film was immersed in water for more than 1 day, and the length was measured as the standard length a. The plain membrane was immersed in an objective organic solvent for the same time as the immersion time in water, and the length was measured as the changed length b. The resistance of the plain membrane to stretching or shrinkage by the organic solvent was evaluated based on the length change ratio of $(b-a)/a \times 100$.

Alcohols such as methanol (MeOH) and isopropanol (IPA), ketones such as acetone and methylethylketone (MEK), and aromatic solvents such as xylene and benzene were used as the test organic solvent. It was found that the plain films of the organic solvent-resistant polyamino-bismaleimides did not show stretching or shrinkage by any of these solvents and it was confirmed that these plain membranes had an excellent organic solvent resistance.

Example 5

PBM-1 prepared in Referential Example 1 was dissolved in dimethylacetamide to form a solution having a concentration of 15%. The formed solution was cast on a glass plate by using an applicator. The solution-cast glass plate was immersed in distilled water (room temperature) to deposit a plain membrane on the glass plate. The membrane was washed with water overnight to form a plain membrane of PBM-1.

Evaluation (1) A pressure of 1 kg/cm² was applied to the plain membrane of PBM-1, and the permeation quantity of pure water per m² for 1 hour was measured. A 0.05% aqueous solution of PEG having an average molecular weight of 50000 was passed through the plain membrane under application of a pressure of 1 kg/cm², and the permeation quantity of water per m² for 1 hour and the rejection ratio of PEG were measured. The obtained results are shown in Table 2.

(2) The formed plain membrane of PBM-1 was immersed in water for more than 1 day and the standard length a was measured. The plain film was immersed in an organic solvent for the same time as the immersion time in water, and the changed length b was measured. Stretching or shrinkage of the plain membrane of PBM-1 was evaluated based on the length change ratio of $(b-a)/a \times 100$. Isopropanol (IPA), acetone, methanol (MeOH) and xylene were used as the test organic solvent. The obtained results are shown in Table 3.

Example 6

The above-mentioned PBM-1, PEG (having an average molecular weight of 1000) and n-methylpyrrolidone were mixed at a ratio of 15/15/70 to form a casting solution. The casting solution was coated on a nylon fabric by using an applicator. The coated nylon fabric was immersed in distilled water (room temperature) to form a PBM-1 film lined with a nylon backing. The membrane was washed with water overnight to obtain a PBM-1 plain film lined with a nylon backing.

Evaluation

The permeation quantity of the lined PBM-1 plain membrane was determined according to the evaluation test (1) described in Example 5. The organic solvent resistance test (2) was not carried out in view of the influences of the nylon backing.

The obtained results are shown in Table 2.

Example 7

A plain membrane was prepared in the same manner as described in Example 5 by using PBM-3 obtained in Referential Example 3. The performances of the plain membrane were evaluated in the same manner as described in Example 5. The obtained results are shown in Tables 2 and 4.

Example 8

A PBM-3 plain membrane lined with a backing was prepared in the same manner as described in Example 6, and the performances of the plain membrane were evaluated in the same manner as described in Example 6. The obtained results are shown in Table 2.

Example 9

A plain membrane was prepared in the same manner as described in Example 5 by using PBM-2 obtained in Referential Example 2. The performances of the plain membrane were evaluated in the same manner as described in Example 5. The obtained results are shown in Tables 2 and 5.

Example 10

A PBM-2 plain membrane lined with a backing was prepared in the same manner as described in Example 6, and the performances of the lined plain membrane were evaluated in the same manner as described in Example 6. The obtained results are shown in Table 2.

TABLE 2

Permeation Quantity of Pure Water and Blocking Ratio of Solute (PEG) [Performance Test (1)]

| Example No. | Permeation Quantity (l/m²·hr) of Pure Water | Permeation Quantity (l/m²·hr) of Water in Presence of PEG | Blocking Ratio (%) of PEG |
|---|---|---|---|
| 5 | 1000 | 85 | 80 |
| 6 | 900 | 70 | 85 |
| 7 | 850 | 76 | 70 |
| 8 | 680 | 83 | 66 |
| 9 | 700 | 70 | 83 |
| 10 | 750 | 80 | 77 |

TABLE 3

Results of Organic Solvent Resistance Test of PBM-1 Plain Membrane [Performance Test (2)]

| Organic Solvent | Change of Length water (a) | Change of Length organic solvent (b) | Change Ratio [(b − a)/a × 100] |
|---|---|---|---|
| IPA | 30 mm | 30 mm | 0% |
| acetone | 31 mm | 31 mm | 0% |
| MeOH | 30 mm | 30 mm | 0% |
| xylene | 30 mm | 30 mm | 0% |

Organic solvent immersion time ≥ 1 day

TABLE 4

Results of Organic Solvent Resistance Test of PBM-3 Plain Membrane [Performance Test (2)]

| Organic Solvent | Change of Length water (a) | Change of Length organic solvent (b) | Change Ratio [(b − a)/a × 100] |
|---|---|---|---|
| IPA | 29 mm | 30 mm | 3% |
| acetone | 30 mm | 30 mm | 0% |
| MeOH | 30 mm | 31 mm | 3% |
| xylene | 29 mm | 30 mm | 3% |

Organic solvent immersion time ≥ 1 day

TABLE 5

Results of Organic Solvent Resistance Test of PBM-2 Plain Membrane [Performance Test (2)]

| Organic Solvent | Change of Length water (a) | Change of Length organic solvent (b) | Change Ratio [(b − a)/a × 100] |
|---|---|---|---|
| IPA | 30 mm | 30 mm | 0% |
| acetone | 30 mm | 31 mm | 3% |
| MeOH | 31 mm | 30 mm | −3% |
| xylene | 30 mm | 30 mm | 0% |

Organic solvent immersion time ≥ 1 day

Bismaleimide polymers preferably used as the membrane filter material in the present invention will now be described. In the following examples and comparative examples, the GPC analysis was carried out under the following condition.

Columns: one column of Shodex AD-800P, one column of Shodex AD-80M and two columns of Shodex AD-803/S Developing solution: dimethylformamide containing 0.01 mole of LiBr Detector: 280 nm (UV)

Reference substance: polyethylene glycol

Example 11

A separable flask having an inner volume of 1 liter was charged with 62.3 g of N,N-(4,4-diphenylmethane)-bismaleimide (BM; purity=96%) and 5 g of a mixture of m-cresol and p-cresol, and 445 g of dichloromethane was added and the mixture was stirred to form a homogeneous solution.

Separately, 14.5 g of piperazine (special class chemical having a purity of at least 99%) was dissolved in 200 g of dichloromethane, and the solution was filled in a dropping funnel. The solution in the dropping funnel was dropped into the above-mentioned BM solution over a period of about 1 hour and reaction was carried out at room temperature. When about 30 minutes had passed from the point of termination of the dropwise addition, precipitation of a polymer began, and stirring was further conducted a whole day and night. In order to remove m-cresol, p-cresol and dichloromethane from the precipitated polymer, the precipitated polymer was finely divided and immersed and washed in methanol for 1 day. Methanol was removed under reduced pressure to obtain a bismaleimide resin (PBM-11). PBM-11 was subjected to the GPC analysis, and the solubility in various solvents such as acetone, methylethylketone, isopropanol (IPA), toluene, cresol, xylene, dichloromethane and trichlene was examined. The obtained results are shown in Table 6.

Example 12

A separable flask having an inner volume of 1 liter was charged with 62.3 g of N,N-(4,4-diphenylmethane)-bismaleimide (BM; purity=96%) and 5 g of a mixture of m-cresol and p-cresol, and 445 g of dichloromethane was added and the mixture was stirred to form a homogeneous solution.

trichlene was examined. The obtained results are shown in Table 6.

Referential Example 4

A separable flask having an inner volume of 1 liter was charged with 62.3 g N,N-(4,4-diphenylmethane)-bismaleimide (BM; purity=96%), and 200 g of a mixture of m-cresol and p-cresol was added and the mixture was stirred to form a homogeneous solution.

Separately, 16.7 g homopiperazine (special class chemical having a purity higher than 99%) was dissolved in 130 g of dichloromethane and the solution was filled in a dropping funnel. The solution in the dropping funnel was dropped into the above-mentioned BM solution over a period of about 1 hour. After termination of the dropwise addition, stirring was further conducted for 5 hours (precipitation of the polymer was not caused during this period).

The polymer/m,p-cresol solution was dropped in methanol to precipitate the polymer. The polymer was immersed and washed in methanol, and methanol was removed under reduced pressure to obtain a bismaleimide resin (PBM-13). PBM-13 was subjected to the GPC analysis and the solubility in various solvents such as acetone, methylethylketone, isopropanol (IPA), toluene, cresol, xylene, dichloromethane and trichlene was examined. The obtained results are shown in Table 6. A film prepared from this polymer was very brittle.

TABLE 6

| | Reaction Conditions | | | | | Resistance to Dissolution in Various Solvents | | |
|---|---|---|---|---|---|---|---|---|
| Example No. | BM (g) | PZ or homopiperazine (g) | BM/PZ molar ratio | GPC MN | MW | acetone | methylethyl ketone | methanol |
| 11 | BM (g) 62.3 | PZ (g) 14.5 | 1 | 15200 | 64800 | observed | observed | observed |
| 12 | MB (g) 62.3 | homopiperazine 16.7 | 1 | 19500 | 49000 | observed | observed | observed |
| C. Ex. 1 | BM (g) 62.3 | homopiperazine 16.7 | 1 | 6100 | 26700 | observed | observed | observed |

| | Resistance to Dissolution in Various Solvents | | | | | |
|---|---|---|---|---|---|---|
| Example No. | isopropanol | toluene | cresol | xylene | dichloromethane | trichlene |
| 11 | observed | observed | observed | observed | observed | observed |
| 12 | observed | observed | observed | observed | observed | observed |
| C. Ex. 1 | observed | observed | not observed | observed | not observed | not observed |

Note: C. Ex.: Comparative Example

Separately, 16.7 g of homopiperazine (special class chemical having a purity higher than 99%) was dissolved in 200 g of dichloromethane and the solution was filled in a dropping funnel. The solution in the dropping funnel was dropped into the above-mentioned BM solution over a period of about 1 hour and reaction was carried out at room temperature. When about 30 minutes had passed from the point of the dropwise addition, precipitation of a polymer began, and the mixture was further conducted a whole day and night.

In order to remove m-cresol, p-cresol and dichloromethane from the precipitated polymer, the precipitated polymer was finely divided and immersed and washed in methanol to obtain a bismaleimide resin (PBM-12). PBM-12 was subjected to the GPC analysis, and the solubility in various organic solvents such as acetone, methylethylketone, methanol, isopropanol (IPA), toluene, cresol, xylene, dichloromethane and As is apparent from the foregoing description, according to the present invention, since a polymer of a bismaleimide compound and a perhydrodiaza-type heterocyclic compound is used as a membrane material, a membrane filter having an excellent organic solvent resistance can be provided, and a membrane filter in the form of a hollow membrane or plain membrane can easily be prepared. Furthermore, according to the process of the present invention, a bismaleimide resin having an excellent organic solvent resistance and a relatively high molecular weight can be prepared. Therefore, an organic solvent-resistant bismaleimide resin having an excellent organic solvent resistance, which is advantageously usable as a membrane filter material and a filler, can be provided.

We claim:

1. A membrane filter material having an excellent organic solvent resistance, which comprises a bismaleimide polymer formed by reacting a bismaleimide compound with a perhydrodiaza heterocyclic compound represented by the following formula:

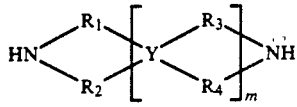

wherein $R_1$, $R_2$, $R_3$ and $R_4$ represent a lower carbon chain which is linear or contains a methyl group or ethyl group on the side chain, Y is $>R<$ or $>N-R-N<$ in which R is a lower carbon chain, and m is 0 or 1.

2. A membrane filter material as set forth in claim 1, wherein the bismaleimide compound is a compound represented by the following general formula:

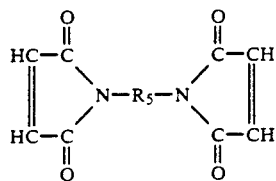

wherein $R_5$ represents a divalent group containing an aromatic ring.

3. A membrane filter material as set forth in claim 2, wherein the molar ratio of the bismaleimide units to the perhydrodiaza heterocyclic compound units in the bismaleimide copolymer is in the range of from 0.7 to 1.3, and the bismaleimide copolymer has a main structural skeleton represented by the following formula:

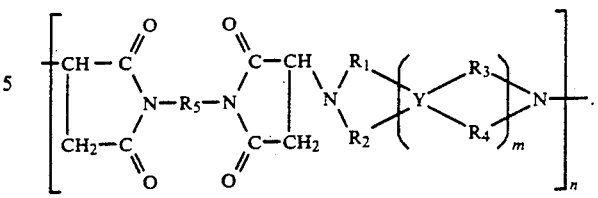

wherein $R_1$, $R_2$, $R_3$ and $R_4$ represent a lower carbon chain which is linear or contains a methyl group or ethyl group on the side chain, $R_5$ represents a divalent group containing an aromatic ring, Y is $>R<$ or $>N-R-N<$ in which R is a lower carbon chain, and m is 0 or 1.

4. A membrane filter material as set forth in claim 1 or 3, wherein the number average molecular weight of the bismaleimide polymer is at least 7000.

5. A membrane filter material as set forth in claim 2, wherein the bismaleimide compound is a member selected from the group consisting N,N'-m-phenylene-bismaleimide, N,N'-p-phenylene-bismaleimide, N,N',4,4'-diphenylmethane-bismaleimide, N,N',4,4'-diphenylether-bismaleimide, N,N',3,4-diphenylether-bismaleimide, N,N',4,4'-diphenylsulfone-bismaleimide, N,N'-m-xylene-bismaleimide, N,N',3,4'-diphenylsulfone-bismaleimide and N,N',4,4'-diphenylmethane-biscitraconimide.

6. A membrane filter material as set forth in claim 2, wherein the perhydrodiaza-type heterocyclic compound is a member selected from the group consisting of piperazine, 2-methylpiperazine, 2,5-dimethylpiperazine, 1,4-perhydrodiazepine, 1,3-di(N-piperazinyl)propane and 1,3-di(4-piperidinyl)propane.

7. An organic solvent-resistant hollow fiber obtained by forming a bismaleimide polymer as set forth in claim 1 into a hollow fiber membrane.

8. An organic solvent-resistant hollow fiber obtained by forming a bismaleimide polymer as set forth in claim 2 into a hollow fiber membrane.

9. An organic solvent-resistant hollow fiber obtained by forming a bismaleimide polymer as set forth in claim 4 into a hollow fiber membrane.

10. An organic solvent-resistant plain film obtained by forming a bismaleimide polymer as set forth in claim 1 into a sheet-shaped filter membrane.

11. An organic solvent-resistant plain membrane obtained by forming a bismaleimide polymer as set forth in claim 2 into a sheet-shaped membrane filter.

12. An organic solvent-resistant plain film obtained by forming a bismaleimide polymer as set forth in claim 4 into a sheet-shaped membrane filter.

* * * * *